Jan. 8, 1963 G. H. CRAWFORD, JR 3,072,592
PROCESS FOR POLYMERIZATION OF FLUORINATED NITROSOALKANE
AND SOLUTION OF RESULTING POLYMER IN
FLUORINATED ORGANIC SOLVENT
Filed Feb. 23, 1960
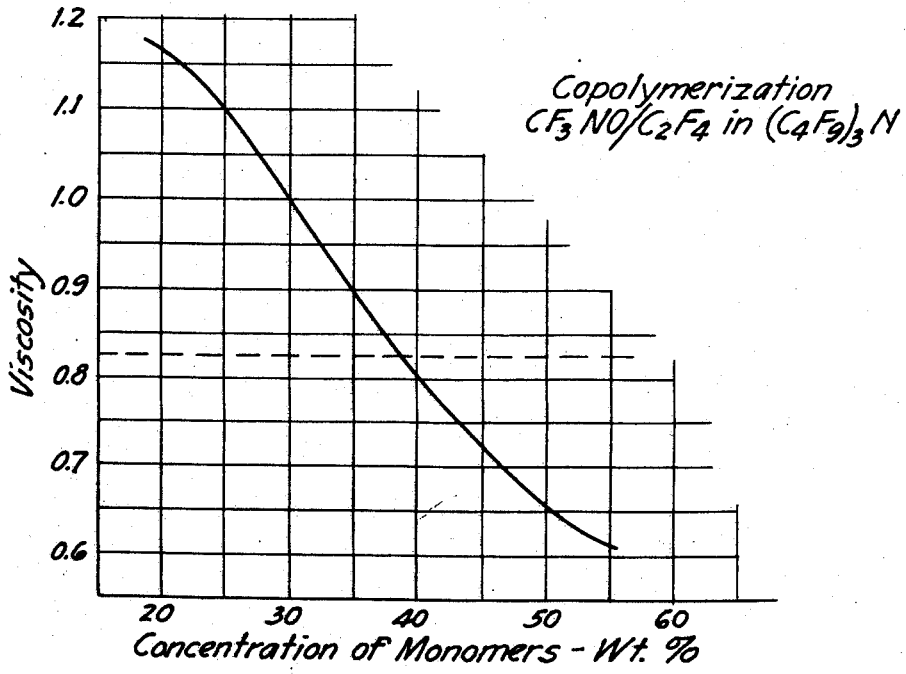
Copolymerization $CF_3NO/C_2F_4$ in $(C_4F_9)_3N$
INVENTOR
GEORGE H. CRAWFORD, JR.
BY
Carpenter, Abbott, Coulter & Kinney
ATTORNEYS United States Patent Office 3,072,592
Patented Jan. 8, 1963

3,072,592
PROCESS FOR POLYMERIZATION OF FLUORINATED NITROSOALKANE AND SOLUTION OF RESULTING POLYMER IN FLUORINATED ORGANIC SOLVENT
George H. Crawford, Jr., Dellwood, White Bear Lake, Minn., assignor to Minnesota Mining and Manufacturing Company, St. Paul, Minn., a corporation of Delaware
Filed Feb. 23, 1960, Ser. No. 10,381
16 Claims. (Cl. 260—32.6)

This invention relates to new and useful fluorine-containing polymers having improved properties and to a method for the preparation thereof. In one aspect this invention relates to new and valuable high molecular weight fluorine-containing resinous thermoplastics and elastomers. In another aspect this invention relates to a new rubber useful for coating surfaces and fabrics to be used under corrosive conditions. This application is a continuation-in-part of my prior and copending applications S.N. 813,639, filed May 18, 1959, and S.N. 824,769, filed July 3, 1959.

The reaction of trifluoronitrosomethane with tetrafluoroethylene has been carried out in bulk type systems to produce low molecular weight liquids or telomers. These liquids could be cross-linked to produce solid space polymers (three dimensional). On the other hand, the polymers of the present invention are solids of high molecular weight.

It is an object of this invention to provide new and useful fluorine-containing polymers.

It is another object of this invention to provide a process for the direct production of solid polymers in contrast to liquid low molecular weight polymers.

Another object of this invention is to provide new fluorine-containing polymers which can be fabricated into various useful objects and articles of manufacture.

Another object of this invention is to provide an elastomeric or rubbery high molecular weight linear copolymer containing fluorine which is compeltely soluble in fluorine-containing halocarbons and which can be vulcanized or cross-linked.

Still another object is to provide new and useful solutions of high molecular weight polymers.

Various other objects and advantages of the present invention will become apparent to those skilled in the art from the accompanying description and disclosure.

According to the present invention, a fluorine-containing nitrosoalkane is polymerized with one or more unsaturated comonomers while the monomers are in solution in fluorinated organic solvent to produce directly a high molecular weight solid copolymer. The powerful tendency toward alternation in most of these copolymer systems renders practicable and reproducible the introduction of a third monomer to produce terpolymers having special and unique properties. The solid polymers of the present invention have average molecular weights above 50 000 and generally above 100,000, and as high as 150,000 and 200,000 or higher, and generally speaking, inherent viscosities between about 0.3 and about 1.5. The polymers prepared in accordance with the present invention are either thermoplastic or elastomeric depending upon the conditions of polymerization and the monomers employed. Many of the elastomeric and thermoplastic copolymers are insoluble in hydrocarbon solvents. Many of the polymers of this invention are thermally stable up to about 200° C. The proportion of the monomeric units in the final polymer varies between about 25 and about 75 mol percent for each of the components. Usually the copolymer is a 1:1 copolymer.

The fluorine-containing nitrosoalkane monomeric material of the present invention is preferably perhalogenated in which the halogens are normally gaseous halogens and preferably the nitrosoalkane contains less than 13 carbon atoms per molecule and is a mononitrosoalkane although dinitrosoalkanes and nitronitrosoalkanes are included within the scope of the term "nitrosoalkane." Nitrosoalkanes of greater number of carbon atoms can be made and used as monomers without departing from the scope of this invention. Typical examples of the fluorine-containing nitrosoalkanes which can be copolymerized in accordance with the present invention include trifluoronitrosomethane, pentafluoronitrosoethane, tetrafluorodinitrosoethane, tetrafluoronitronitrosoethane, trifluorochlorodinitrosoethane, heptafluoronitrosopropane, hexafluorodinitrosopropane, hexafluoronitronitrosopropane, mononitrosoperfluorobutane, octafluorodinitrosobutane, mononitrosoperfluorooctane, trifluorodichloronitrosoethane, 1-nitroso-1,3,5,7,7,7-hexachlorononafluoroheptane, and 1-nitroso-1,3,5,7,9,9,9-heptachlorododecafluorononane.

The mononitrosoalkanes are typically prepared by reacting a fluorine-containing alkyl halide of less than 13 carbon atoms, such as an alkyl bromide or an alkyl iodide, with nitric oxide in approximately equal molar ratios in the presence of mercury and ultraviolet light for about 24 hours at ambient temperature to produce the corresponding mononitrosoalkane. The use of the bromide is preferred because it is much cheaper than the iodide. For example, trifluoromethylbromide or iodide is reacted with nitric oxide to produce trifluoronitrosomethane; pentafluoroethylbromide or iodide is reacted with nitric oxide to produce pentafluoronitrosoethane; and heptafluoropropylbromide or iodide is reacted with nitric oxide to produce heptafluoronitrosopropane. Also, the chlorofluoronitrosoalkanes can be prepared from chlorotrifluoroethylene telomers of trichlorobromomethane in a similar manner.

A convenient empirical formula for representing the mononitroso compounds is $R_f$—NO where $R_f$ is a perhalogenated alkyl radical containing fluorine on the carbon atom adjacent to the nitroso group and in which the other halogens are selected from the group consisting of chlorine and fluorine. Preferably, the alkyl radical has not more than 6 carbon atoms.

The nitroso containing adducts of olefins are prepared by reacting nitric oxide with a fluorine-containing olefin to produce a compound containing a carbon chain of at least two carbon atoms having an oxide of nitrogen group attached to each of two adjacent carbon atoms in said chain in which at least one of said oxide of nitrogen groups is a nitroso group. Preferably, the olefin has at least one halogen atom attached to at least one of the carbon atoms of the double bond and therefore the resultant adduct also contains at least one halogen atom on at least one of the carbon atoms of the former double bond. The reaction between the nitric oxide and the olefin is carried out in either the liquid or vapor phase within a wide range of conditions. The temperature of reaction is usually between about 10° C. and about 100° C. Preferably, the reaction is carried out at ambient temperature conditions. In some cases, an energy source, such as infrared light or ultraviolet light, can be employed. Under such conditions, the reaction is carried out generally in the vapor phase but sufficient pressure may be utilized to cause either or both of the reactants to be present in the reaction zone in the liquid phase without departing from the scope of this invention. The reaction time is usually between about one-half hour and about 30 hours. Preferably, the reaction is carried out with an excess of olefin being present at the reaction site. The total charge of reactants is a mol ratio of nitric oxide to olefin of approximately 2:1.

In some instances, mixtures of nitroso and nitro compounds are produced, which mixtures can be separated into their separate components by fractional distillation or by other conventional methods. With some olefins and under suitable reaction conditions primarily the dinitroso adducts may be obtained, while with other olefins primarily the nitro nitroso adducts may be obtained. Formation of the dinitroso adducts, $R_f(NO)_2$, in which $R_f$ is a fluorine-containing alkyl radical, is favored by conditions prohibiting the formation of $NO_2$ or oxidizing agents in the reaction zone.

The olefin employed in the reaction with the nitric oxide is preferably an acyclic monoolefin-1 containing not more than 12 carbon atoms per molecule, generally not more than 6 carbon atoms, and preferably contains at least one halogen atom attached to at least one of the carbon atoms of the double bond. Preferably, these halogens are normally gaseous halogens. The resulting adducts are the 1,2-nitronitrosoalkanes and 1,2-dinitrosoalkanes, such as 1,2-nitronitrosotetrafluoroethane and 1,2-dinitrosotrifluorochloroethane. The preferred class of olefins is the perhalogenated olefins in which at least one fluorine atom is attached to each of the carbon atoms of the double bond. Examples of perhalogenated olefins are tetrafluoroethylene, trifluorochloroethylene, perfluoropropene, and perfluorobutene-1, unsymmetrical diflorodichloroethylene, 2-chloropentafluoropropene-1, and 1,1-dichlorotetrafluoropropene-1. Other olefins which may be employed are those which are only partially halogenated, such as vinylidene fluoride, difluoromonochloroethylene, 1,1-chlorofluoroethylene, trifluoroethylene, 1,1-dihydroperfluoropropene-1, and 1,1-dihydroperfluorobutene-1.

The comonomers with which the adducts of the present invention are copolymerized are the polymerizable unsaturated organic compounds, preferably having ethylenic unsaturation and not more than about 10 carbon atoms per molecule. More preferably, these are halogen-containing acyclic olefins having at least two fluorine atoms per molecule, and any other halogens are gaseous halogens. Both unsubstituted and substituted unsaturated organic compounds may be employed as a comonomer without departing from the scope of this invention. Examples of substituted unsaturated organic compounds which are useful as a comonomer are the monoolefins containing at least one fluorine atom on at least one carbon atom of the double bond, such as vinylidene fluoride, trifluoroethylene, difluoromonochloroethylene, tetrafluoroethylene, trifluorochloroethylene, unsymmetrical difluorodichloroethylene, and perfluoropropene; the fluorine-containing diolefins, such as 1,1-difluorobutadiene-1,3, 1,1,2-trifluorobutadiene-1,3, 1,1,3-trifluorobutadiene-1,3, 1,1-difluoro-2-methylbutadiene-1,3, 1,1-difluoro-3-methylbutadiene-1,3, 1,1-difluoro-2-trifluoromethylbutadiene-1,3, and 1,1,2,4,4-pentafluorobutadiene; and fluorine-containing vinyl ethers, such as 2,2,2-trifluoroethylvinyl ether, methyltrifluorovinyl ether and γ-trifluoromethoxytetrafluoropropylvinyl ether ($CF_3OC_2F_4CH_2OCH=CH_2$); and the fluorine-containing esters, such as the acrylate ester of 1,1-dihydroheptafluorobutanol, methacrylate ester of n-ethylperfluorooctane sulfonamido ethanol, and acrylate ester of n-propylperfluorooctane sulfonamido ethanol. Non-halogenated substituted comonomers which may be used are propyl vinyl ether, acrylonitrile and styrene. An example of a non-substituted olefinically unsaturated comonomer is butadiene. In addition to straight copolymerization of a nitrosoalkane with one of the above comonomers, two or more of any combination of the above monomers may be polymerized with a nitrosoalkane.

Various polymerization techniques may be utilized to copolymerize the monomers of the present invention with a nitrosoalkane to produce solid polymers, such as bulk polymerization and emulsion and suspension polymerization in water, with or without a catalyst, concerning which reference may be had to the aforesaid applications for details thereof. In accordance with this invention, however, the polymerization is carried out in liquid phase in a fluorinated organic solvent in which the monomers are polymerized under autogenous pressure at temperatures below between about −50 and about 100° C., preferably between about −25 and about 25° C. for a period of time of at least one-half hour without a catalyst or promoter to obtain up to 90 percent conversion to the solid polymer. The charge may utilize an excess of either the nitroso-containing monomer or the olefin, but preferably a 1:1 mol ratio is used.

The solvent utilized for the polymerization should be capable of dissolving both monomers and is usually also capable of dissolving the polymer product at the conditions of polymerization. Hydrocarbons and solvents containing halogens other than fluorine are not suitable because they result in the production of a polymer of low molecular weight as a consequence of chain transfer with solvents of this type. The best solvents are the saturated perfluoro organic compounds, such as the perfluoroalkanes, the perfluoroethers and the perfluoroalkylamines. Suitable examples of solvents include perfluorocyclobutane, perfluorooctane, perfluoro $C_6$ and $C_8$ cyclic ethers, and perfluorotributylamine, the latter being preferred.

Polymerizations in perfluoro organic compounds, such as perfluorotributylamine, give polymer products in general that are of higher molecular weight than can be achieved with bulk polymerization under otherwise equivalent conditions of polymerization. Solution polymerizations in which both monomers and polymers are soluble would be expected to result in a polymer of lower molecular weight than a bulk polymerization. The molecular weight of the polymer would also be expected to decrease with decreasing monomer concentration. Surprisingly, the opposite was found to be true; molecular weight increased with decreasing monomer concentration as is shown in the figure in the drawing.

The drawing shows the effect of concentration of monomer in solvent $(C_4F_9)_3N$ on polymerizations at −20° C. The drawing indicates that, at concentrations of trifluoronitrosomethane and tetrafluoroethylene in a mol ratio of 1:1, between about 5 and about 50 weight percent, preferably between about 20 and about 35 weight percent, gave best results in terms of molecular weight (inherent viscosity) of the copolymer product. The dotted line in the drawing represents the inherent viscosity obtained from a bulk polymerization using the same polymerization conditions and ratio of monomers.

One of the advantages of solution polymerization is the fact that the temperature of polymerization can be maintained substantially constant at the desired value thus narrowing the molecular weight distribution of the product insofar as this varies with the temperature fluctuation arising from the heat of polymerization. For example, in bulk polymerization the heat of polymerization causes in some cases an abrupt temperature rise of 40° C. or higher at the outset of the polymerization. The use of the solution process effectively minimizes this temperature surge to not more than about 20° C.

The advantages in the use of the solution polymerization technique manifest themselves particularly when the process is up-scaled. It is well known that bulk polymerizations do not lend themselves to large scale methods. At the end of the bulk polymerization, the reaction mixture solidifies or becomes at least semi-solid; thus, it cannot be stirred no readily removed from the reaction vessel. Furthermore, in cases in which a sizeable heat of reaction is evolved, this heat is very difficultly removed from a non-mobile reaction mixture. This situation becomes progressively aggravated as the size of the reaction is increased. In certain instances, failure to remove the heat of reaction from a polymerization may actually result in a dangerous situation wherein the reaction becomes autocatalytic and explosions can occur. Aside from this, the solution process of the present invention produces in one step a transparent, mobile, polymer solution which can be used directly for various coating, sealing and similar applications. In applications, such as those applications associated with electrical properties, in which the presence of emulsifiers, salts and other polar materials normally associated with aqueous polymerizations is deleterious, the solution technique employing a completely inert solvent which itself has excellent electrical propreties is desirable.

The present polymerization of the nitrosoalkane with an olefin proceeds through a free radical mechanism and numerous experiments have demonstrated that the polymerization proceeds by this mechanism. For example, using conventional chain transfer agents in the polymerization results in a material decrease in molecular weight of the product. In other experiments, cationic catalysts were used, such as $TiCl_4$ and $BF_3$ etherate which are known to inhibit anionic reactions, and did not have any effect upon the molecular weight; this, therefore, would rule out an anionic reaction mechanism. Since the system works well with perhalogenated monomers, the cationic-type mechanism would also appear to be impossible. In fact, any ionic-type polymerization mechanism is known to be inhibited by aqueous systems; and since the present reaction can be effected readily in an aqueous emulsion system, it is clear that the type of reaction involved is a free radical mechanism even though no catalyst or promoter is utilized in the polymerization process. Most likely the first step in the initiation process involves homolytic cleavage of the nitrosoalkane.

The above accounts for the fact that it is essential in the present system to provide pure and clean monomer in order to produce a solid high molecular weight polymer of the present invention. The mononitrosoalkane monomers are made from materials which act as free radical transfer agents; for example, trifluoromethyliodide and trifluoromethylbromide. These latter compounds are noted as very active free radical chain transfer agents. Therefore, only by special care in purifying such monomers derived from these precursor materials is it possible to produce the high molecular weight polymer having an essentially linear structure. In general, the monomers should contain less than one weight percent of any impurities, such as trifluoromethylbromide, and preferably less than 0.5 weight percent impurities, particularly when the impurity is trifluoromethyliodide. If the impurity content of the monomers exceeds the above values, the polymer molecular weight is substantially below 50,000, usually around 7,000 to 15,000 molecular weight.

In order to obtain such a purified monomer of the nitrosoalkane, a packed distillation column of at least 70 theoretical plates should be used. For example, the use of a distillation column of 50 or less theoretical plates and of inefficient construction results in an impurity content as high as 20 weight percent.

The 1:1 copolymer of the mononitrosoalkane has a linear-type structure which has been substantiated by chemical analysis and nuclear magnetic resonance determination.

The solid high molecular weight polymers of the present invention are useful as sealants, adhesives and surface coatings such as for metal and glass surfaces. The polymer of the present invention can be coated on various surfaces directly from the solution produced in the polymerization system. In the case of using the solution for coating of a surface, the deposited polymer after evaporation of the solvent medium forms a continuous homogeneous nonporous film on the surface with satisfactory adhesion thereto.

The solid rubbery copolymers of this invention may be preformed at temperatures above 150° C. into various articles, such as gaskets and O-rings, and vulcanized to produce stiffer and harder articles.

The following examples are offered as a better understanding of the various aspects of this invention including the preparation of monomers and polymers and should not be construed as limiting the invention.

EXAMPLE I

A 50/50 mol ratio charge of $CF_3Br$ (74.5 grams) and NO (15.0 grams) was agitated in the presence of mercury and ultraviolet light (2537 A.) for 24 hours. The pressure was maintained at about one atmosphere by intermittently charging NO as the pressure decreased. The product was distilled in a 35 inch long reflux column having 70 theoretical plates using aluminum turnings as packings and at a reflux temperature of about −84° C. to produce a 60 percent yield of trifluoronitrosomethane substantially free from $CF_3Br$ (less than one weight percent).

EXAMPLE II 5 grams of $CF_3NO$ (made and purified as above) and 5 grams of $C_2F_4$ were charged to a 30 ml. Pyrex ampoule and agitated therein in the absence of a catalyst for 24 hours at −20° C. An 85% conversion was obtained based upon the $C_2F_4$ charged. The product was a rubbery high molecular weight polymer having an inherent viscosity of about 0.85 corresponding to an estimated average molecular weight above 100,000. The polymer in the glass reactor was dissolved in perfluorocyclobutane and removed from the reactor in solution (no insoluble residue).

The copolymer product of the above run had the following physical and chemical properties.
$CF_3NO/C_2F_4$ gum—properties:

$<n>$ inherent viscosity 0.85 gum rubber
  Analysis (C, F, N)—indicates 1:1 comonomer ratio
  Infrared—shows disappearance of N=O bond
  N.M.R.—linear structure

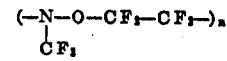

$Tg$ (by $n^d$)— −51° C.
  24 hours swell, A.S.T.M. fluid II—(gum)
  Gehman $T_{10}$— −38° C. (vulcanizing stock)
  Torsional modulus 40 p.s.i. (vulcanized stock)
  Thermally stable to 200° C.

EXAMPLE III

Equimolar quantities of NO and $C_2F_4$ were charged into a 12.5 litre 3-necked flask to a pressure totaling one atmosphere or .25 mol each. The vessel was irradiated 16 hours with infrared light. At the end of this period a pressure drop of 0.5 atmosphere was noted. The vessel contained a blue gas. This was forced out of the flask through a series of three water scrubbers by introducing water into the flask. The gas was collected, then fractionated by distillation. The distillation was carried out in a screen-saddle packed column of 10 theoretical plates. To the distillation pot was added an equal volume of water for the absorption or hydrolysis of any remaining impurities. 21 grams of a deep blue liquid boiling 21.5–22.5° C., accounting for 65 weight percent of the starting materials was obtained. The infrared spectrum showed a strong band at 6.25μ corresponding to the —N=O grouping. The compound analyzed 11.9 weight percent carbon. The Dumas molecular weight of the gas averaged 179. Nuclear magnetic resonance determinations and the above analytical information indicated the gas to comprise essentially the nitro nitroso adduct $(ONCF_2CF_2NO_2)$.

EXAMPLE IV

Into a 12.5 litre 3-necked flask were introduced ⅔ atmosphere of NO and ⅓ atmosphere $CF_2$—CFCl. After five days the pressure had dropped to .78 atmosphere and the flask contained a blue gas. The contents of the flask were pumped out and condensed in Dry Ice. 2.1 grams of blue liquid were obtained after water washing to remove oxides of nitrogen and hydrolyzable impurities. This liquid was distilled under vacuum. Its boiling point, corrected to one atmosphere, was 64° C. Nuclear magnetic resonance analysis and molecular weight determinations appeared to indicate the structure to be

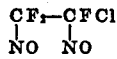

$$CF_2\text{—}CFCl$$
$$|\quad\quad|$$
$$NO\quad NO$$

EXAMPLE V 3 grams of $CF_3NO$ (purified) and 3 grams of $C_2F_4$ were dissolved in perfluorotributylamine in a concentration of 30 weight percent. The solution was then placed in a polymerization Pyrex ampoule and polymerized therein for 24 hours at —20° C. A 90% conversion was obtained based upon $C_2F_4$ charged. The polymer was recovered from the solvent by distillation of the solvent. The polymer thus recovered had the following properties:

Structure

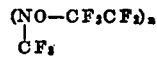

$$(NO\text{—}CF_2CF_2)_x$$
$$|$$
$$CF_3$$

Tg (by $n^d$) _____° C__ −51
A.S.T.M. #2 fuel swell, 24 hours_____percent__ 3
Inherent viscosity _____ 1.05
Percent crystallinity_____ 0
Weight loss—24 hours @ 200 °C_____percent__ 0
Weight loss—24 hours @ 250° C_____do____ 20

EXAMPLE VI

The following Table 1 shows the solubility of the present copolymers in various solvents at room temperature. The polymers had an inherent viscosity of about 0.8.

Table 1

| Solvent | Solubility |
|---|---|
| Copolymer of $CF_3NO/C_2F_4$: | |
| Acetone | Totally insoluble. |
| Methyl ethyl ketone | |
| Dimethyl sulfoxide | |
| Tetrahydrofuran | |
| Carbon disulfide | |
| Benzene | v. slight swell. |
| Dichloromethane | slight swell. |
| Carbon tetrachloride | Do. |
| Fluorotrichloromethane (Freon 11) | sl. soluble. |
| 1,1,2-trichlorotrifluoroethane (Freon 113). | soluble to about 30% |
| Mixed perfluorocyclic ethers $(C_4F_9)_3N$ | Miscible, all proportions. |
| Perfluoropropene | |
| Perfluorocyclobutane | |
| Copolymer of $ONCF_2NO_2/C_2F_4$: | |
| Hydrocarbon solvents $(C_4F_9)_3N$ | Insoluble 2%. |
| 1,1,2-trichlorotrifluoroethane | miscible, all proportions. |
| Xylene hexafluoride | |

EXAMPLE VII

The following Table 2 shows the results of copolymerizations similarly carried out in accordance with the conditions of Example V with different solvents. The monomers were $CF_3NO$ and $C_2F_4$. A polymer with an inherent viscosity $<n>$ below about 0.3 was considered as being too low for satisfactory elastomeric properties.

Table 2

| Run No. | Solvent | Time, Hrs. | Conversion, percent | $<n>$ |
|---|---|---|---|---|
| 1 | $CCl_3F$ | 18 | 30 | 0.21 |
| 2 | $Cl_2FCCF_2Cl$ | 18 | 42 | 0.24 |
| 3 | $C_7F_7H$ | 46 | 35 | 0.20 |
| 4 | $n\text{-}C_7H_{16}$ | 17 | 45 | 0.10 |
| 5 | $C_8F_{16}O$ | 18 | 56 | 0.46 |
| 6 | $(C_4F_9)_3N$ | 22 | 78 | 1.04 |

EXAMPLE VIII 3.25 grams (0.016 mol) $C_3F_7NO$, B.P. —12° C., was condensed into a 30 ml. Pyrex ampoule containing perfluorinated $C_6$ cyclic ether (15 cc.). This ampoule was equipped for constant pressure comonomer feed, having an inlet tube placed below the surface of the above solution, and with provision for magnetic stirring, and maintained at any desired temperature. Tetrafluoroethylene was fed intermittently into this apparatus at 100–120 p.s.i. through a diaphragm regulator, while maintaining the reaction mixture at 0° C. Thus, of monomers present, the $C_3F_7NO$ was always in excess. After 20 hours of running time, the blue color of $C_3F_7NO$ had disappeared. On opening the tube and evaporating the solvent 4.5 grams (92%) of elastomeric gum were obtained. The inherent viscosity was $<n>$=0.38 which corresponded to an average molecular weight of about 70,000 to 90,000.

EXAMPLE IX

A copolymer of $CF_3NO$ and $C_2F_4$ ($n$=0.825) produced in accordance with the examples was milled with a vulcanization composition and then cured at about 250° F. for 30 minutes and then post cured at 240° F. for 36 hours. The vulcanization recipe is shown in Table 3 below based on 100 parts by weight of copolymer.

Table 3

Parts
ZnO _____ 5.0
Sulfur _____ 2.0
HMDA _____ 3.0
Filler _____ None

The results of the cure is shown in Table 4 below:

Table 4

F break (p.s.i.) _____ 225
Elongation (break)_____percent__ 670
24 hour swell in 70% isooctane/30% toluene _____do____ 3
Set at break_____do____ 0
Gehman $T_{10}$_____° C__ −41

EXAMPLE IX

The following are some of the copolymers that have been produced in accordance with the procedure represented by the examples.

Table 5

| Nitroso Monomer | Olefin Monomer | Polymerization | | | Nature of Polymer |
|---|---|---|---|---|---|
| | | Time, Hrs. | Temp., °C. | Conver., percent | |
| $C_3F_5NO$ | $C_2F_4$ | 24 | −20 | 100 | Rubber linear. |
| $C_3F_7NO$ | $C_2F_4$ | 24 | −16 | 100 | Do. |
| $C_8F_{17}NO$ | $C_2F_4$ | 24 | −20 | 50 | Do. |
| $NO_2CF_2CF_2NO$ | $C_2F_4$ | 24 | −20 | 85 | Solid, linear. |
| $NO_2CF_2CF_2NO$ | $CF_2CCl_2$ | 24 | −20 | 80 | Thermoplastic, linear. |
| $NO_2CF_2CF_2NO$ | $CF_2CFCl$ | 24 | −20 | 85 | Do. |
| $CF_3NO$ | $CH_2=CF_2$ | 3 wks. | −15 to −20 | 37 | Grease. |
| $CF_3NO$ | $CF_2CFCl$ | 24 | −15 | 100 | Rubber, linear. |
| $CF_3NO$ | $CF_2CCl_2$ | 24 | −20 | 100 | Short, tough, rubber, linear. |
| $CF_3NO$ | $C_6H_5CH=CH_2$ | 24 | −14 | | Oil. |
| $CF_3NO$ | $CH=C(CH_3)COOC_4H_9$ | 24 | −14 | 80 | Do. |
| $CF_3NO$ | $CF_2=CFH$ | 6 | +20 | 85 | Rubber, linear. |
| $CF_3NO$ | $CClF=CF-O-CH_3$ | 6 | −20 | 85 | Glassy. |
| $CF_3NO$ | $CF_2=CFCH=CH_2$ | 24 | −20 | 60 | Short rubber, linear. |
| $CF_3NO$ | $CF_3CF_2CF=CH_2$ | 48 | +40 | 5 | Thermoplastic, linear. |
| $NO_2CF_2CF_2NO$ | $CF_2CFH$ | 24 | +20 | 40 | Elastomeric, stiff. |

Various modifications and alterations of the process as well as various other products will become apparent to those skilled in the art from the teachings of the invention without departing from the scope thereof.

Having described my invention, I claim:

1. A polymerization process which comprises copolymerizing a fluorine-containing nitrosoalkane with an ethylenically unsaturated monomer while the monomers are in solution in a fluorinated organic solvent at a temperature between about −50° C. and about 100° C. to produce a high molecular weight solid copolymer having a molecular weight above 50,000 and containing between about 25 and about 75 mol percent of the nitrosoalkane monomeric units.

2. A polymerization process which comprises copolymerizing a perhalogenated nitrosoalkane containing fluorine with a fluorine-containing ethylenically unsaturated comonomer containing at least 1 fluorine atom on at least 1 carbon atom of the double bond while the monomers are in solution in a saturated perfluoro organic solvent at a temperature between about −50° C. and about 100° C. to produce a high molecular weight solid copolymer having a molecular weight above 50,000 and containing between about 25 and about 75 mol percent of nitrosoalkane monomeric units.

3. The process of claim 2 in which the concentration of monomers in the solution is between about 5 and about 50 weight percent.

4. The process of claim 3 in which said solvent is perfluorotributylamine.

5. The process of claim 3 in which said solvent is perfluorocyclobutane.

6. The process of claim 3 in which said solvent is perfluoro $C_8$ cyclic ether.

7. The process of claim 3 in which said solvent is perfluoro $C_6$ cyclic ether.

8. The process of claim 3 in which said solvent is perfluorooctane.

9. The process of claim 3 in which said nitrosoalkane is a mononitrosoalkane.

10. The process of claim 9 in which the mononitrosoalkane is trifluoronitrosoalkane.

11. The process of claim 3 in which said nitrosoalkane is a nitronitrosoalkane.

12. The process of claim 11 in which the nitronitrosoalkane is 1,2-nitronitrosotetrafluoroethane.

13. The process of claim 3 in which said nitrosoalkane is a dinitrosoalkane.

14. The process of claim 13 in which the dinitrosoalkane is 1,2-dinitrosotetrafluoroethane.

15. A solution comprising a solid high molecular weight copolymer having a molecular weight above 50,000 of between about 25 and about 75 mol percent of a fluorine-containing nitrosoalkane and a fluorine-containing ethylenically unsaturated monomer dissolved in a fluorine-containing organic solvent selected from the group consisting of perfluoropropene, perfluorocyclobutane, perfluorooctane, perfluoro $C_6$ cyclic ether, perfluoro $C_8$ cyclic ether, perfluorotributyl amine, 1,1,2-trichlorotrifluoroethane, xylene hexafluoride and mixtures thereof.

16. A solution comprising a solid high molecular weight copolymer having a molecular weight above 50,000 of between about 25 and about 75 mol percent of a perhalogenated nitrosoalkane containing fluorine and a perhalogenated ethylenically unsaturated monomer containing at least 1 fluorine atom on at least 1 carbon atom of the double bond dissolved in an amount of at least 5 weight percent in a fluorine-containing organic solvent selected from the group consisting of perfluoropropene, perfluorocyclobutane, perfluorooctane, perfluoro $C_6$ cyclic ether, perfluoro $C_8$ cyclic ether, perfluorotributyl amine, 1,1,2-trichlorotrifluoroethane, xylene hexafluoride and mixtures thereof.

References Cited in the file of this patent

Golding: "Polymers and Resins," Van Nostrand Company, New York (1959), page 133.

Barr et al.: "J. Chem. Soc." (London), 1955, pages 1881–1889.

Mason et al.: "The Technology of Plastics and Resins," Van Nostrand Company, New York (1945), page 34.